US012100958B2

(12) United States Patent
Nuqui et al.

(10) Patent No.: US 12,100,958 B2
(45) Date of Patent: Sep. 24, 2024

(54) CLOUD-BASED HYBRID STATE ESTIMATION

(71) Applicant: Hitachi Energy Ltd, Zürich (CH)

(72) Inventors: Reynaldo Nuqui, Cary, NC (US); Ming Liang, Raleigh, NC (US)

(73) Assignee: HITACHI ENERGY LTD, Zürich (CH)

( * ) Notice: Subject to any disclaimer, the term of this patent is extended or adjusted under 35 U.S.C. 154(b) by 652 days.

(21) Appl. No.: 16/555,051

(22) Filed: Aug. 29, 2019

(65) Prior Publication Data
US 2021/0063985 A1 Mar. 4, 2021

(51) Int. Cl.
*H02J 3/24* (2006.01)
*G05B 19/04* (2006.01)
(Continued)

(52) U.S. Cl.
CPC .......... *H02J 3/242* (2020.01); *G05B 19/0415* (2013.01); *G05B 19/058* (2013.01); *G06F 17/16* (2013.01); *G05B 19/045* (2013.01)

(58) Field of Classification Search
CPC .. H02J 3/242; H02J 13/00001; H02J 2203/20; H02J 3/00; G05B 19/058;
(Continued)

(56) References Cited

U.S. PATENT DOCUMENTS 3,903,399 A * 9/1975 Enns .................... G06G 7/63
703/3
7,499,816 B2 3/2009 Scholtz et al.
(Continued)

FOREIGN PATENT DOCUMENTS

CN 101577426 B 11/2011
CN 102005757 B 10/2012
(Continued)

OTHER PUBLICATIONS

James et al., Hybrid State Estimation including PMU Measurements, 2015 International Conference on Control, Communication & Computing India (ICCC) | Nov. 19-21, 2015 | Trivandrum (Year: 2015).*

(Continued)

*Primary Examiner* — Kyle R Quigley
(74) *Attorney, Agent, or Firm* — Slater Matsil, LLP

(57) ABSTRACT

Systems, methods, techniques and apparatuses of power network state estimation are disclosed. One exemplary embodiment is a method for state estimation in a power network comprising receiving a set of supervisory control and data acquisition (SCADA) information including a power network topology; generating a SCADA state estimation using the set of SCADA information; receiving, with a cloud-computing architecture, a set of PMU phasors; aligning, with the cloud-computing architecture, a timestamp of the SCADA estimation and a timestamp of the set of PMU phasors; updating, with the cloud-computing architecture, the power network topology using the set of PMU phasors; generating, with the cloud-computing architecture, a hybrid state estimation using the updated power network topology, the set of PMU phasors, and the SCADA state estimation; and transmitting the hybrid state estimation to a local control system.

20 Claims, 2 Drawing Sheets

(51) Int. Cl.
*G05B 19/05* (2006.01)
*G06F 17/16* (2006.01)
*G05B 19/045* (2006.01)

(58) Field of Classification Search
CPC ... G05B 19/0415; G05B 19/045; G06F 17/16; G06Q 50/06; Y02B 90/20; Y02E 40/70; Y02E 60/00; Y04S 10/18; Y04S 10/22; Y04S 10/40; Y04S 20/00; Y04S 40/20
See application file for complete search history.

(56) References Cited

U.S. PATENT DOCUMENTS

| | | | |
|---|---|---|---|
| 8,190,379 | B2 | 5/2012 | Rehtanz et al. |
| 8,634,965 | B1 | 1/2014 | Gou et al. |
| 8,738,191 | B2 | 5/2014 | Aivaliotis et al. |
| 9,627,886 | B2 | 4/2017 | Sun et al. |
| 2003/0120440 | A1* | 6/2003 | Zima ............... H02H 7/22 702/57 |
| 2006/0259255 | A1* | 11/2006 | Anderson ........ G09B 29/003 702/64 |
| 2007/0086134 | A1* | 4/2007 | Zweigle .......... G01R 19/2513 361/85 |
| 2007/0206644 | A1* | 9/2007 | Bertsch ......... H02J 13/00016 370/503 |
| 2008/0140326 | A1* | 6/2008 | Scholtz ............. G01R 29/18 702/60 |
| 2009/0125158 | A1* | 5/2009 | Schweitzer, III .. G01R 19/2513 700/297 |
| 2011/0066301 | A1* | 3/2011 | Donolo ................ H02J 3/18 700/292 |
| 2012/0179301 | A1 | 7/2012 | Aivaliotis et al. |
| 2013/0018515 | A1 | 1/2013 | Majumder |
| 2013/0282188 | A1 | 10/2013 | Donde et al. |
| 2015/0066401 | A1* | 3/2015 | Donde ............. G01R 19/2513 702/60 |
| 2015/0066402 | A1* | 3/2015 | Feng ............. H02J 13/00002 702/60 |
| 2015/0142187 | A1 | 5/2015 | Yamane et al. |
| 2015/0371151 | A1* | 12/2015 | Georgescu ........... G06N 20/00 706/12 |
| 2016/0299187 | A1* | 10/2016 | Liang ................. H02H 1/0092 |
| 2018/0062390 | A1* | 3/2018 | Parashar ........... G01R 19/2513 |
| 2018/0096628 | A1* | 4/2018 | Fairchild ............... G09B 19/00 |

FOREIGN PATENT DOCUMENTS

| | | |
|---|---|---|
| CN | 103154934 A | 6/2013 |
| CN | 102723711 B | 7/2014 |
| CN | 105242143 B | 5/2018 |
| JP | 2013208051 A | 10/2013 |
| JP | 5486686 B2 | 5/2014 |
| JP | 2018064375 A | 4/2018 |
| WO | 2017196374 A1 | 11/2017 |

OTHER PUBLICATIONS

X. Kong et al., "A Hybrid State Estimator Based on SCADA and PMU Measurements for Medium Voltage Distribution System," Applied Sciences, dated Sep. 1, 2018, 18 pp., vol. 8, No. 9, MDPI, Basel, Switzerland.

K. Maheshwari et al., "Toward a reliable, secure and fault tolerant smart grid state estimation in the cloud," 2013 IEEE PES Innovative Smart Grid Technologies Conference (ISGT), dated Apr. 15, 2013, 6 pp., IEEE, Piscataway, USA.

Anderson, Dave, et al., "GridCloud: Infrastructure for Cloud-Based Wide Area Monitoring of Bulk Electric Power Grids", IEEE Transactions on Smart Grid, vol. 10, No. 2, Mar. 2019, pp. 2170-2179.

Maheshwari, Ketan, et al., "Toward a reliable, secure and fault tolerant smart grid state estimation in the cloud", IEEE PES Innovative Smart Grid Technologies Conference (ISGT), Washington, DC, USA, Feb. 23-27, 2013, total 6 pages.

Roberts, C.M., et al., "Improving Distribution Network Model Accuracy using Impedance Estimation from Micro-Synchrophasor Data", IEEE Power and Energy Society General Meeting (PESGM), Boston, MA, USA, Jul. 17-21, 2016, total 6 pages.

* cited by examiner

CLOUD-BASED HYBRID STATE ESTIMATION

BACKGROUND

The present disclosure relates generally to power network state estimation. Energy management system applications use state estimations for control and protection of the power network. Conventional state estimation includes using supervisory control and data acquisition (SCADA) measurements and network topology data to generate a SCADA state estimation at regular intervals, such as 5-15 minute intervals. Control and protection applications use the generated SCADA state estimation until a new SCADA state estimation is generated during the next interval. Existing power network state estimation suffers from a number of shortcomings and disadvantages. There remain unmet needs including increasing state estimation accuracy and increasing state estimation response to significant changes in the power network. Waiting several minutes for a new state estimation may jeopardize the health and efficiency of the power network. As more low-inertia power generation systems are added to the power network, the likelihood of sudden shifts in power generation increases. For example, a change in cloud cover or a change in wind speed would alter the actual states of the power network such that the current SCADA state estimation is no longer an accurate representation of the power network. Furthermore, the opening of a circuit breaker, or other changes in network topology, would also cause the actual states of the power network to deviate from the current SCADA state estimation. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for power network state estimation. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
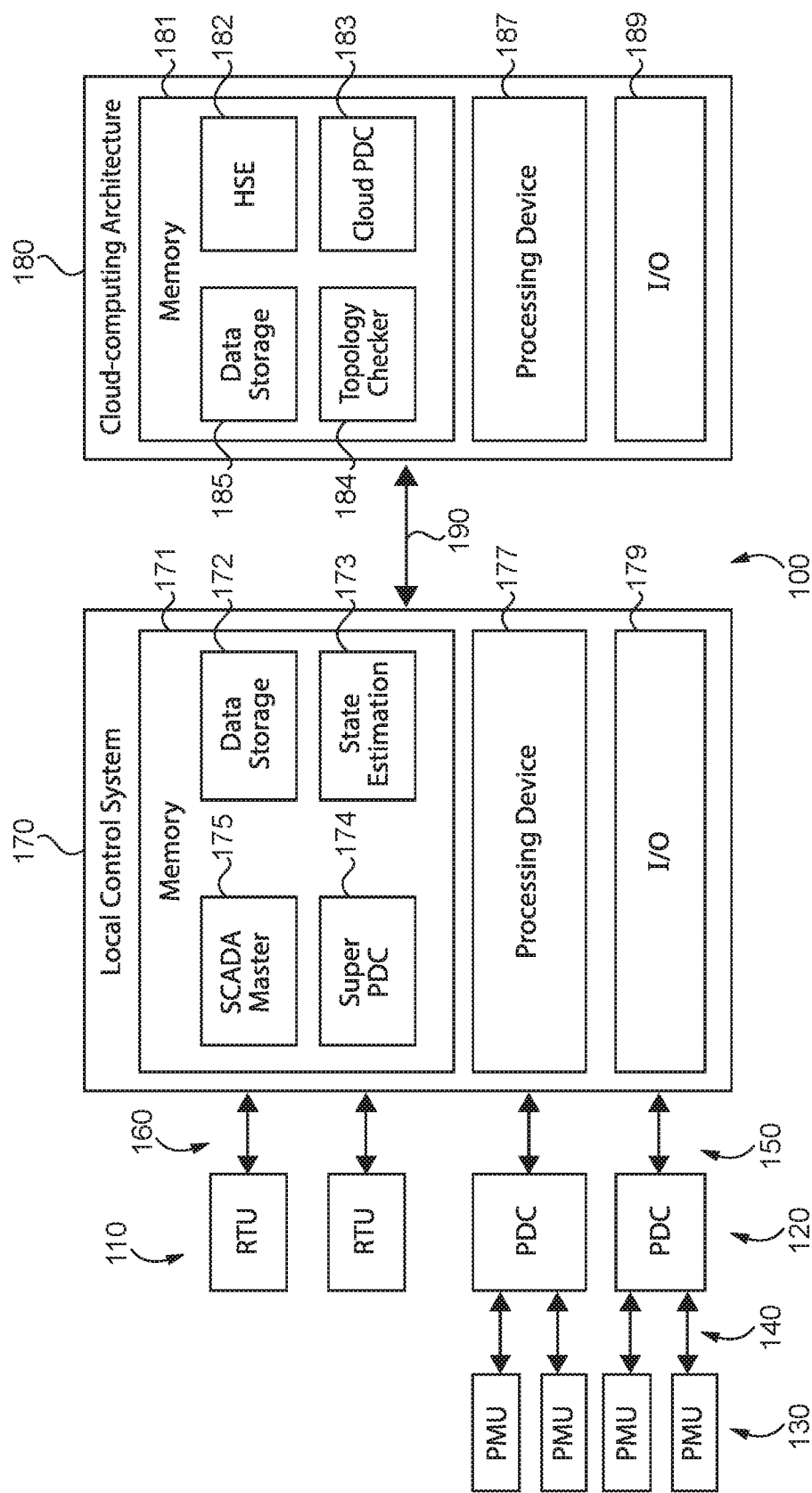
FIG. 1 is a block diagram illustrating an exemplary state estimation system.

With reference to FIG. 1, there is illustrated an exemplary state estimation system 100 for a power network. System 100 is structured to generate a new state estimation and a network topology in near real-time. For example, system 100 may generate a new state estimation at least every second or every half-second, to name but a few examples. It shall be appreciated that system 100 may be implemented in a variety of power networks, including power transmission systems and power distribution systems, to name but a few examples.

System 100 includes a plurality of remote terminal units (RTUs) 110, a plurality of phasor measurement units (PMUs) 130, a plurality of phasor data concentrators (PDCs) 120, a local control system (LCS) 170, and a cloud-computing architecture 180. It shall be appreciated that the topology of system 100 is illustrated for the purpose of explanation and is not intended as a limitation of the present disclosure. For example, an exemplary state estimation system may include more or fewer RTUs, PDCs, or PMUs, to name but a few examples.

Each of the plurality of RTUs 110 are structured to receive SCADA information corresponding to characteristics of the power network from a plurality of sensors or meters and transmit the SCADA information to local control system 170. The SCADA information may be transmitted to the plurality of RTUs continuously and transmitted to local control system 170 in response to being polled by local control system 170. The SCADA information may be received from intelligent electronic devices (IEDs), relays, sensors, or other devices structured to monitor the power network. The SCADA information may include measurements such as voltage measurements, current measurements, or power measurements. For example, the measurements may include bus voltages, real power injection, reactive power injection, and line flow. The SCADA information may also include a network topology including a plurality of on/off statuses for controllable switches, including circuit breakers, within the power network. In certain embodiments, the plurality of RTUs 110 are structured to receive instructions from local control system 170 and operate controllable devices of the power network in response to receiving the instructions. The controllable devices may include controllable switches such as circuit breakers or disconnectors, to name but a few examples.

The plurality of RTUs 110 and local control system 170 communicate by way of an RTU/LCS communication network 160 using a communication protocol. For example, the plurality of RTUs 110 and local control system 170 may use a communication protocol based on distributed network protocol (DNP3), the IEC 60870-5-101 standard, or the IEC 60870-5-104 standard.

The plurality of PMUs 130 is structured to synchronize measured electrical characteristics of the power network using a common time source and output synchronized phasors, also known as synchrophasors, corresponding to the measured electrical characteristics. The phasors may correspond to a voltage magnitude and phase angle or a current magnitude and phase angle. For example, a PMU may output a voltage phasor based on measurements of a bus or output a current phasor based on measurements of current through a distribution line. In certain embodiments, some of the PMUs may be replaced with other devices having the PMU functionality described above, such as an IED or a protective relay. Each of the plurality of PMUs 130 transmits the phasors to one of the plurality of PDCs 120.

Each PDC of the plurality of PDCs 120 is structured to communicate with multiple PMUs of the plurality of PMUs 130. In the illustrated embodiment, each PDC of the plurality of PDCs 120 aggregates phasors from the multiple PMUs, aligns the phasors into sets of PMU phasors based on the timestamps of each phasor, and transmits aligned sets of PMU phasors to local control system 170. In certain embodiments, one or more of the plurality of PDCs 120 transmits aligned sets of PMU phasors directly to a cloud PDC application 183 of cloud-computing architecture 180. In certain embodiments, each PDC transmits sets of PMU phasors at the same frequency as the phasors are received by the PDC. For example, each PDC transmits sets of PMU phasors at a rate of 60 sets of PMU phasors per second or 30 sets of PMU phasors per second, to name but a few examples.

The plurality of PMUs 130 and the plurality of PDCs 120 communicate by way of a PMU/PDC communication network 140 using a communication protocol. For example, the plurality of PMUs 130 and the plurality of PDCs 120 may use a communication protocol based on the IEEE c37.118 standard, to name but one example.

The plurality of PDCs 120 and local control system 170 communicate by way of a PDC/LCS communication network 150 using a communication protocol. For example, the plurality of PDCs 120 and local control system 170 may use a communication protocol based on the IEEE c37.118 standard, to name but one example.

Local control system 170 includes an input/output device 179, a processing device 177, and a memory device 171. Local control system 170 may be a stand-alone device, an embedded system, or a plurality of devices structured to perform the functions described with respect to local control system 170. For example, local control system 170 may be an energy management system (EMS).

Input/output device 179 enables local control system 170 to communicate with a plurality of external devices including the plurality of RTUs 110, the plurality of PDCs 120, and cloud-computing architecture 180. Input/output device 179 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 179 may be comprised of hardware, software, and/or firmware. It is contemplated that input/output device 179 includes more than one of these adapters, credentials, or ports, such as a first port for receiving data and a second port for transmitting data.

Processing device 177 is structured to execute applications stored on memory device 171. Processing device 177 may be a programmable type, a dedicated, hardwired state machine, or a combination thereof. Processing device 177 may include multiple processors, Arithmetic-Logic Units (ALUs), Central Processing Units (CPUs), Digital Signal Processors (DSPs), or a Field-programmable Gate Array (FPGA), to name but a few examples. For forms of processing device 177 with multiple processing units, distributed, pipelined, or parallel processing may be used. Processing device 177 may be dedicated to performance of just the operations described herein or may be used in one or more additional applications. In the illustrated form, processing device 177 is of a programmable variety that executes processes and processes data in accordance with applications including sets of instructions stored in memory device 171. Alternatively or additionally, programming instructions are at least partially defined by hardwired logic or other hardware. Processing device 177 may be comprised of one or more components of any type suitable to process the signals received from input/output device 179 or elsewhere, and provide output signals. Such components may include digital circuitry, analog circuitry, or a combination of both.

Memory device 171 is structured to store supervisory control and data acquisition (SCADA) information, phasor data, and a plurality of applications including a SCADA master application 175, a data storage application 172, a state estimation application 173, and a super PDC application 174. Memory device 171 may be of one or more types, such as a solid-state variety, electromagnetic variety, optical variety, or a combination of these forms, to name but a few examples. Furthermore, memory device 171 may be volatile, nonvolatile, transitory, non-transitory, or a combination of these types, and some or all of memory device 171 may be of a portable variety, such as a disk, tape, memory stick, or cartridge, to name but a few examples.

SCADA master application 175 includes instructions executable by processing device 177 effective to poll the plurality of RTUs 110, receive SCADA information including measurements and a network topology from the plurality of RTUs 110, timestamp the SCADA information, and transmit the received SCADA information to state estimation application 173 and data storage application 172. In certain embodiments, SCADA master application 175 transmits the SCADA information to state estimation application 173 every 5-15 minutes.

State estimation application 173 includes instructions executable by processing device 177 effective to generate a SCADA state estimation of the power network using SCADA information received from SCADA master application 175. State estimation application 173 may generate the SCADA state estimation using weighted least squares, weighted least absolute values, or extended Kalman filters, to name but a few examples. Once the SCADA state estimation is generated, it is timestamped by application 173. In certain embodiments, state estimation application 173 generates a SCADA state estimation every 5-15 minutes.

Super PDC application 174 includes instructions executable by processing device 177 effective to receive phasors from each of the plurality of PDCs 120, align the phasors using the timestamps of the phasors, and transmit sets of aligned phasors to a cloud PDC application 183 of cloud-computing architecture 180 as well as data storage application 172. In certain embodiments, super PDC application 174 receives phasors from the plurality of PDCs 120 at a rate of 30-120 times per second.

Data storage application 172 includes instructions executable by processing device 177 effective to archive phasors received by super PDC application 174, archive the SCADA state estimations generated by state estimation application 173, and archive SCADA information received by SCADA master application 175. For example, data storage application 172 may maintain six months of historical values, to name but one example.

Cloud-computing architecture 180 is a system of scalable system resources with on-demand availability. Cloud-computing architecture 180 includes an input/output device 189, a processing device 187, and a memory device 181. In certain embodiments, cloud-computing architecture 180 is a virtualized platform with a cloud broker structured to allocate scalable computing resources.

Input/output device 189 enables cloud-computing architecture 180 to communicate with local control system 170. For example, input/output device 189 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 189 may be comprised of hardware, software, and/or firmware. It is contemplated that input/output device 189 includes more than one of these adapters, credentials, or ports, such as a first port for receiving data and a second port for transmitting data.

Processing device 187 includes multiple processing units using distributed, pipelined, or parallel processing. In the illustrated form, processing device 187 is of a programmable variety that executes applications in accordance with programming instructions (such as software or firmware) stored in memory device 181. Processing device 187 may be comprised of one or more components of any type suitable to process the signals received from input/output device 189 or elsewhere, and provide output signals. Such components may include digital circuitry, analog circuitry, or a combination of both.

Memory device 181 is structured to store SCADA information, PMU phasors, and a plurality of applications including a cloud PDC application 183, a topology checker application 184, a hybrid state estimation application 182, and a data storage application 185. Memory device 181 may be of one or more types, such as a solid-state variety, electromagnetic variety, optical variety, or a combination of these forms, to name but a few examples. Furthermore, memory device 181 may be volatile, nonvolatile, transitory, non-transitory, or a combination of these types, and some or all of memory device 181 may be of a portable variety, such as a disk, tape, memory stick, or cartridge, to name but a few examples.

Cloud PDC application 183 includes instructions executable by processing device 187 effective to receive phasors from super PDC application 174. In certain embodiments, cloud PDC application 183 may also perform monitoring functions such as visualization of power network events, to name but one example.

Topology checker application 184 includes instructions executable by processing device 187 effective to determine power network topology using the PMU phasors received by cloud PDC application 183. If topology checker application 184 detects any changes to the on/off statuses of the controllable switches of the power network, the application 184 updates the power network topology before transmitting the updated power network topology to hybrid state estimation application 182. In certain embodiments, topology checker application 184 is structured to determine a power network topology by generating a new power network topology using the PMU phasors. Since the PMU phasors correspond to more recent measurements of the power network, the generated power network topology will reflect any updates in on/off statuses of switches in the power network. In certain embodiments, application 184 is configured to determine power network topology by comparing the PMU phasors to the network topology transmitted by SCADA master application 175 to determine if any on/off statuses of controllable switches of the power network have changed since the most recent SCADA state estimation. For example, a zero current phasor for a distribution line indicating a circuit breaker has been opened indicates a change in power network topology where the network topology received from SCADA master application 175 included a closed status for the circuit breaker.

In other embodiments, topology checker application 184 is configured to generate a network topology using the current set of PMU phasors and compare the generated network topology to a network topology generated using the previous set of phasors or the network topology transmitted by SCADA master application 175. In response to determining the network topology based on the current set of PMU phasors includes updates to the power network topology, the updated network topology is transmitted to hybrid state estimation application 182. By using each new set of aligned phasors to update the network topology, cloud-computing architecture 180 is configured to output a hybrid state estimation reflecting changes in network topology in near real-time.

Hybrid state estimation application 182 includes instructions executable by processing device 187 effective to generate a hybrid state estimation using the SCADA state estimation generated by state estimation application 173 and the most recently received set of PMU phasors received by cloud PDC application 183, as described in more detail below.

Before performing hybrid state estimation, application 182 aligns the timestamps of the received SCADA state estimation and the set of PMU phasors by identifying the most recent SCADA state estimation and the most recent set of PMU phasors for use in the hybrid state estimation. Once aligned, application 182 converts any values of the SCADA state estimation and the synchronized phasor data in polar format to rectangular format. Once hybrid state estimation is completed, the estimated states are converted from rectangular format back to polar format.

Hybrid state estimation application 182 transmits the hybrid state estimation to local control system 170 for use in network control systems. In certain embodiments, local control system 170 receives a new hybrid state estimation from cloud-computing architecture 180 every second or less. In certain embodiments, local control system 170 receives a new hybrid state estimation every half-second or less.

Data storage application 185 includes instructions executable by processing device 187 effective to archive sets of aligned phasors received from local control system 170, archive the hybrid state estimations generated by state estimation application 182, archive SCADA information received from local control system 170, and archive SCADA state estimations received from local control system 170. Data storage application 185 may maintain one year of archived values, to name but one example.

Local control system 170 and cloud-computing architecture 180 communicate by way of LCS/Cloud communication network 190. Multiple communication protocols may be used to exchange data in LCS/Cloud communication network 190. For example, synchronized phasor data may be transmitted from super PDC application 174 to cloud PDC application 183 using phasor data transfer protocol, also known as IEEE C37.118 protocol, to name but one example. SCADA state estimations, hybrid state estimations, SCADA information, and archived data may be transmitted between local control system 170 and cloud-computing architecture 180 using file transfer protocol (FTP), to name but one example.

Figure 2:
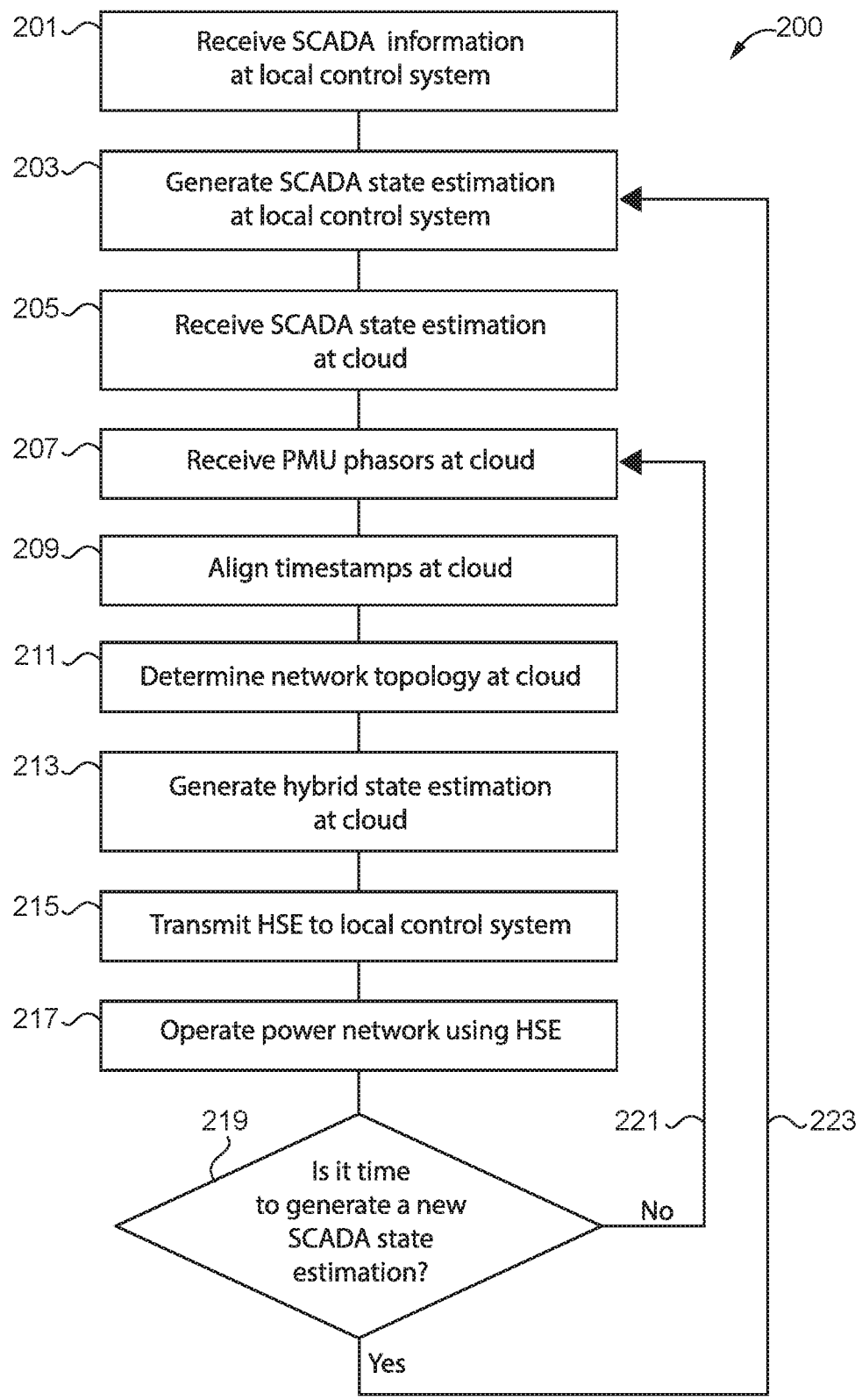
FIG. 2 is a flowchart illustrating an exemplary state estimation process.

With reference to FIG. 2, there is illustrated an exemplary process 200 for state estimation of a power network implemented by an exemplary state estimation system, such as state estimation system 100 of FIG. 1. It shall be appreciated that a number of variations and modifications to process 200 are contemplated including, for example, the omission of one or more aspects of process 200, the addition of further conditionals and operations, and/or the reorganization or separation of operations and conditionals into separate processes.

Process 200 begins at operation 201 where a local control system including a SCADA master station receives SCADA information from a plurality of power network devices. The SCADA information may include measurements and a power network topology. The measurements may include voltage measurements, current measurements, or power measurements. For example, the measurements may include bus voltages, real power injection, reactive power injection, and line flow. The power network topology includes a plurality of on/off statuses for controllable switches of the power network. The power network devices may include remote terminal units (RTUs), intelligent electronic devices (IEDs), relays, sensors, or other devices structured to monitor the power network. The measurements and device statuses of the SCADA information may include a timestamp, but measurements are not synchronized with a common time source.

Process 200 proceeds to operation 203 where a state estimator of the local control system generates a SCADA state estimation using the set of SCADA information. The state estimator may use one of a plurality of algorithms to generate the SCADA state estimation, such as weighted least squares, weighted least absolute values, or extended Kalman filters, to name but a few examples.

Process 200 proceeds to operation 205 where the local control system transmits, and a cloud-computing architecture receives, the SCADA state estimation.

Process 200 proceeds to operation 207 where the cloud-computing architecture receives a set of PMU phasors generated by a plurality of PMUs of the power network. In certain embodiments, the set of PMU phasors are received from a plurality of PDCs of the power network at a cloud PDC of the cloud-computing architecture. In certain embodiments, the set of PMU phasors are received from a super PDC of the local control system, the super PDC having aggregated and aligned the set of PMU phasors from the plurality of PDCs of the power network. Each PMU phasor corresponds to a voltage phasor or a current phasor. The set of PMU phasors are synchronized, and therefore each include the same timestamp.

Process 200 proceeds to operation 209 where the cloud-computing architecture aligns the timestamp of the SCADA estimation and the timestamps of the set of PMU phasors by identifying the most recently received SCADA estimation and the most recently received set of PMU phasors.

Process 200 proceeds to operation 211 where the cloud-computing architecture determines a current power network topology using the set of PMU phasors received at operation 207. In certain embodiments, the cloud-computing architecture uses the received set of PMU phasors to generate an updated network topology. In certain embodiments, the received set of PMU phasors are compared to a previously generated network topology to detect changes in the power network. The cloud-computing architecture then updates the power network topology in response to detecting changes in the power network.

Process 200 proceeds to operation 213 where the cloud-computing architecture generates a hybrid state estimation using the determined power network topology from operation 211, the set of PMU phasors, and the SCADA state estimation. In certain embodiments, the cloud-computing architecture generates the hybrid state estimation by performing weighted least squares state estimation using the following equation where x is the state estimation vector, A is the function matrix, W is the hybrid weight matrix, and $z^{hybrid}$ is the measurement matrix:

$$x=[A^T W^{-1} A]^{-1}[W^{-1} A] z^{hybrid} \quad (1)$$

Function matrix A includes the following values, where 1 represents a unit matrix, 1' represents a unit matrix with zeros on the diagonal where no voltage phasors have been measured, and $C_{1-4}$ are matrices comprising line conductances and susceptance for those power lines from which current phasor measurements were received.

$$A = \begin{bmatrix} 1 & 0 \\ 0 & 1 \\ 1' & 0 \\ 0 & 1' \\ C_1 & C_2 \\ C_3 & C_4 \end{bmatrix}$$

$z^{hybrid}$ includes the following values, where $V_r^{(1)}$ and $V_i^{(1)}$ are real and imaginary components of voltage estimation results from the SCADA estimation in rectangular format, $V_r^{(2)}$ and $V_i^{(2)}$ are real and imaginary components of voltage phasor measurements from the set of PMU phasors in rectangular format, and $I_r^{(2)}$ and $I_i^{(2)}$ are real and imaginary components of current phasor measurements from the set of PMU phasors in rectangular format.

$$z^{hybrid} = \begin{bmatrix} V_r^{(1)} \\ V_i^{(1)} \\ V_r^{(2)} \\ V_i^{(2)} \\ I_r^{(2)} \\ I_i^{(2)} \end{bmatrix}$$

W includes the following, where $W_1$ is the weight matrix for the SCADA state estimation and $W_2$ is the weight matrix for the set of PMU phasors. Each weight matrix may be determined based on an accuracy class of the sensors transmitting measurements to each PMU.

$$W = \begin{bmatrix} W_1 & 0 \\ 0 & W_2 \end{bmatrix}$$

Process 200 proceeds to operation 215 where the cloud-computing architecture transmits, and the local control system receives, the hybrid state estimation.

Process 200 proceeds to operation 217 where the local control system operates the power network using the hybrid state estimation. In certain embodiments, the local control system may provide the hybrid state estimation to advanced EMS applications. The hybrid state estimation may be used for economic dispatch, protection, and stability analysis, to name but a few examples. Because the hybrid state estimation is updated multiple times during an economic scheduling period, high inertia generation systems may be given more time to prepare to provide power at the next scheduling period and low inertia generation systems, such as solar and wind-based power sources, may be controlled to respond to changes in the power network during a scheduling period. The hybrid state estimation may also be used by a system operator to visualize events that cannot be visualized by the lower frequency SCADA state estimation, such as power swings or inter-area oscillations, to name but a few examples.

Process 200 proceeds to conditional 219 where the local control system decides whether it is time to generate a new SCADA state estimation. For example, a new SCADA state estimation may be generated at a SCADA interval of 5-15 minutes. If the time has come to generate a new SCADA state estimation, process 200 returns to operation 203, forming an operational loop 223.

If the local control system determines a new SCADA state estimation does not need to be generated, process 200 returns to operation 207, forming an operational loop 221. Every time a new SCADA state estimation needs to be generated, process 200 executes loop 223. Within a SCADA interval, process 200 executes loop 221 effective to update state estimation and network topology in near real-time.

Further written description of a number of exemplary embodiments shall now be provided. One embodiment is a method for state estimation in a power network comprising: receiving a set of supervisory control and data acquisition (SCADA) information including a power network topology; generating a SCADA state estimation using the set of SCADA information; receiving, with a cloud-computing architecture, a set of PMU phasors; aligning, with the cloud-computing architecture, a timestamp of the SCADA estimation and a timestamp of the set of PMU phasors; determining, with the cloud-computing architecture, the power network topology using the set of PMU phasors; generating, with the cloud-computing architecture, a hybrid state estimation using the determined power network topology, the set of PMU phasors, and the SCADA state estimation; and transmitting the hybrid state estimation to a local control system.

In certain embodiments of the foregoing method, the method comprises generating the hybrid state estimation includes performing weighted least squares states estimation using the following equation and matrices, where x is the state estimation vector, A is the function matrix, W is the hybrid weight matrix, and $z^{hybrid}$ is the measurement matrix, 1 represents a unit matrix, 1 represents a unit matrix with zeros on the diagonal where no voltage phasors have been measured, and $C_{1-4}$ are matrices comprising line conductances and susceptance for those power lines from which current phasor measurements were received.

$$x = [A^T W^{-1} A]^{-1} [W^{-1} A] z^{hybrid}$$

$$A = \begin{bmatrix} 1 & 0 \\ 0 & 1 \\ 1' & 0 \\ 0 & 1' \\ C_1 & C_2 \\ C_3 & C_4 \end{bmatrix}$$

In certain forms, the measurement matrix includes the following, where $V_r^{(1)}$ and $V_i^{(1)}$ are real and imaginary components of voltage estimation results from the SCADA estimation in rectangular format, $V_r^{(2)}$ and $V_i^{(2)}$ are real and imaginary components of voltage phasor measurements from the set of PMU phasors in rectangular format, and $I_r^{(2)}$ and $I_i^{(2)}$ are real and imaginary components of current phasor measurements from the set of PMU phasors in rectangular format.

$$z^{hybrid} = \begin{bmatrix} V_r^{(1)} \\ V_i^{(1)} \\ V_r^{(2)} \\ V_i^{(2)} \\ I_r^{(2)} \\ I_i^{(2)} \end{bmatrix}$$

In certain forms, the set of SCADA information includes voltage measurements of the power network and the power network topology includes on/off statuses of circuit breakers of the power network. In certain forms, generating the SCADA estimation is performed by the local control system. In certain forms, the method comprises iteratively performing the steps of receiving a new set of PMU phasors, aligning the SCADA estimation timestamp and the timestamp of the new set of PMU phasors, determining the power network topology using the new set of PMU phasors, generating an updated hybrid state estimation using the SCADA state estimation and the new set of PMU phasors, and transmitting the updated hybrid state estimation until the local control system transmits a second SCADA state estimation to the cloud-computing architecture. In certain forms, the step of transmitting the updated hybrid state estimation is performed at least once per second. In certain forms, the step of transmitting the updated hybrid state estimation is performed at least twice per second. In certain forms, determining the power network topology includes detecting a change of the topology of the power network using the set of PMU phasors, and updating the power network topology to include the detected change. In certain forms, determining the power network topology includes updating an on/off status of a circuit breaker of the power network topology in response to comparing the set of PMU phasors to the power network topology.

Another exemplary embodiment is a state estimation system for a power network comprising: a local control system configured to receive a set of supervisory control and data acquisition (SCADA) information including a power network topology, transmit a SCADA state estimation generated using the set of SCADA information; and a cloud-computing architecture configured to receive a set of PMU phasors, align a timestamp of the SCADA estimation and a timestamp of the set of PMU phasors, determine the power network topology using the set of PMU phasors, generate a hybrid state estimation using the determined power network topology, the set of PMU phasors, and the SCADA state estimation, and transmitting the hybrid state estimation to a local control system.

In certain forms of the foregoing state estimation system, generating the hybrid state estimation includes performing weighted least squares states estimation using the following equation and matrices, where x is the state estimation vector, A is the function matrix, W is the hybrid weight matrix, and $z^{hybrid}$ is the measurement matrix, 1 represents a unit matrix, 1' represents a unit matrix with zeros on the diagonal where no voltage phasors have been measured, and $C_{1-4}$ are matrices comprising line conductances and susceptance for those power lines from which current phasor measurements were received.

$$x = [A^T W^{-1} A]^{-1} [W^{-1} A] z^{hybrid}$$

$$A = \begin{bmatrix} 1 & 0 \\ 0 & 1 \\ 1' & 0 \\ 0 & 1' \\ C_1 & C_2 \\ C_3 & C_4 \end{bmatrix}$$

In certain forms, the measurement matrix includes the following, where $V_r^{(1)}$ and $V_i^{(1)}$ are real and imaginary components of voltage estimation results from the SCADA estimation in rectangular format, $V_r^{(2)}$ and $V_i^{(2)}$ are real and imaginary components of voltage phasor measurements from the set of PMU phasors in rectangular format, and $I_r^{(2)}$ and $I_i^{(2)}$ are real and imaginary components of current phasor measurements from the set of PMU phasors in rectangular format.

$$z^{hybrid} = \begin{bmatrix} V_r^{(1)} \\ V_i^{(1)} \\ V_r^{(2)} \\ V_i^{(2)} \\ I_r^{(2)} \\ I_i^{(2)} \end{bmatrix}$$

In certain forms, the set of SCADA information includes voltage measurements of the power network and the power network topology includes on/off statuses of circuit breakers of the power network. In certain forms, generating the SCADA estimation is performed by the local control system. In certain forms, the cloud-computing architecture is configured to iteratively generate a new hybrid state estimation each time the cloud-computing architecture receives a new set of PMU phasors using the new set of PMU phasors and the SCADA state estimation until the local control system transmits a second SCADA state estimation to the cloud-computing architecture. In certain forms, the cloud-computing architecture generates a new hybrid state estimation at least once per second. In certain forms, the cloud-computing architecture generates a new hybrid state estimation at least twice per second. In certain forms, determining the power network topology includes detecting a change of the topology of the power network using the set of PMU phasors, and updating the power network topology to include the detected change. In certain forms, determining the power network topology includes updating an on/off status of a circuit breaker of the power network topology in response to comparing the set of PMU phasors to the power network topology.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A method for state estimation in a power network, the method comprising:

receiving, at a local control system, a set of supervisory control and data acquisition (SCADA) information including a power network topology;

generating, at the local control system, a SCADA state estimation using the set of SCADA information;

receiving, with a cloud-computing architecture, a set of phasors, each phasor providing a voltage magnitude and phase angle or a current magnitude and phase angle;

aligning the set of phasors, with the cloud-computing architecture, based on a timestamp of the SCADA state estimation and a timestamp of the set of phasors;

determining, with the cloud-computing architecture, the power network topology using the aligned set of phasors;

generating, with the cloud-computing architecture, a hybrid state estimation using the determined power network topology, the aligned set of phasors, and the SCADA state estimation; and transmitting the hybrid state estimation to the local control system wherein the local control system operates the power network using the hybrid state estimation, wherein generating the hybrid state estimation comprises performing weighted least squares states estimation using the following equation and matrices:

$$x = [A^T W^{-1} A]^{-1} [W^{-1} A] z^{hybrid}$$

$$A = \begin{bmatrix} 1 & 0 \\ 0 & 1 \\ 1' & 0 \\ 0 & 1' \\ C_1 & C_2 \\ C_3 & C_4 \end{bmatrix}$$

where x is a state estimation vector, A is a function matrix, W is a hybrid weight matrix, and $z^{hybrid}$ is a measurement matrix, 1 represents a unit matrix, 1' represents a unit matrix with zeros on the diagonal where no voltage phasors have been measured, and $C_{1-4}$ are matrices comprising line conductance and susceptance for those power lines from which current phasor measurements were received.

2. The method of claim 1, wherein $z^{hybrid}$ can be defined using the following equation:

$$z^{hybrid} = \begin{bmatrix} V_r^{(1)} \\ V_i^{(1)} \\ V_r^{(2)} \\ V_i^{(1)} \\ I_r^{(2)} \\ I_i^{(2)} \end{bmatrix}$$

where Vr(1) and Vi(1) are real and imaginary components of voltage estimation results from the SCADA estimation in rectangular format, Vr(2) and Vi(2) are real and imaginary components of voltage phasor measurements from the set of phasors in rectangular format, and Ir(2) and Ii(2) are real and imaginary components of current phasor measurements from the set of phasors in rectangular format.

3. The method of claim 1, wherein the set of SCADA information includes voltage measurements of the power network and the power network topology includes on/off statuses of circuit breakers of the power network.

4. The method of claim 1, comprising iteratively performing the steps of receiving a new set of phasors, aligning the SCADA estimation timestamp and the timestamp of the new set of phasors, determining the power network topology using the new set of phasors, generating an updated hybrid state estimation using the SCADA state estimation and the new set of phasors, and transmitting the updated hybrid state estimation until the local control system transmits a second SCADA state estimation to the cloud-computing architecture.

5. The method of claim 4, wherein the step of transmitting the updated hybrid state estimation is performed at least once per second.

6. The method of claim 5, wherein the step of transmitting the updated hybrid state estimation is performed at least twice per second.

7. The method of claim 1, wherein determining the power network topology comprises detecting a change of the power network topology using the set of phasors, and updating the power network topology to include the detected change.

8. The method of claim 1, wherein determining the power network topology comprises updating an on/off status of a circuit breaker of the power network topology in response to comparing the set of phasors to the power network topology.

9. The method of claim 1, wherein receiving the set of phasors comprises receiving a set of PMU phasors from a phasor measurement unit (PMU).

10. The method of claim 1, wherein receiving the set of phasors comprises receiving a set of PMU phasors from an intelligent electronic devices (IED) or a protective relay.

11. The method of claim 1, further comprising:
transmitting, by one or more phasor management units, phasors providing a voltage magnitude and phase angle or a current magnitude and phase angle;
receiving, by one or more phasor data concentrators, the phasors from the one or more phasor management units; and
transmitting, by the one or more phasor data concentrators, a set of phasors, each phasor providing a voltage magnitude and phase angle or a current magnitude and phase angle.

12. A state estimation system for a power network, the state estimation system comprising:
a local control system configured to receive a set of supervisory control and data acquisition (SCADA) information including a power network topology and to transmit a SCADA state estimation generated using the set of SCADA information; and
a cloud-computing architecture configured to receive a set of phasors that each provide a voltage magnitude and phase angle or a current magnitude and phase angle, to align the set of phasors based on a timestamp of the SCADA state estimation and a timestamp of the set of phasors, to determine the power network topology using the aligned set of phasors, to generate a hybrid state estimation using the determined power network topology, the aligned set of phasors, and the SCADA state estimation, and to transmit the hybrid state estimation to the local control system wherein the local control system operates the power network using the hybrid state estimation, wherein the cloud-computing architecture is configured to generate the hybrid state estimation by performing weighted least squares states estimation using the following equation and matrices:

$$x = [A^T W^{-1} A]^{-1} [W^{-1} A] z^{hybrid}$$

$$A = \begin{bmatrix} 1 & 0 \\ 0 & 1 \\ 1' & 0 \\ 0 & 1' \\ C_1 & C_2 \\ C_3 & C_4 \end{bmatrix}$$

where x is a state estimation vector, A is a function matrix, W is a hybrid weight matrix, and $z^{hybrid}$ is a measurement matrix, 1 represents a unit matrix, 1' represents a unit matrix with zeros on the diagonal where no voltage phasors have been measured, and $C_{1-4}$ are matrices comprising line conductance and susceptance for those power lines from which current phasor measurements were received.

13. The state estimation system of claim 12 wherein $z^{hybrid}$ can be defined using the following equation:

$$z^{hybrid} = \begin{bmatrix} V_r^{(1)} \\ V_i^{(1)} \\ V_r^{(2)} \\ V_i^{(1)} \\ I_r^{(2)} \\ I_i^{(2)} \end{bmatrix}$$

where Vr(1) and Vi(1) are real and imaginary components of voltage estimation results from the SCADA estimation in rectangular format, Vr(2) and Vi(2) are real and imaginary components of voltage phasor measurements from the set of phasors in rectangular format, and Ir(2) and Ii(2) are real and imaginary components of current phasor measurements from the set of phasors in rectangular format.

14. The state estimation system of claim 12, wherein the set of SCADA information includes voltage measurements of the power network and the power network topology includes on/off statuses of circuit breakers of the power network.

15. The state estimation system of claim 12, wherein the local control system is configured to generate the SCADA estimation.

16. The state estimation system of claim 12, wherein the cloud-computing architecture is configured to iteratively generate a new hybrid state estimation each time the cloud-computing architecture receives a new set of phasors using the new set of phasors and the SCADA state estimation until the local control system transmits a second SCADA state estimation to the cloud-computing architecture.

17. The state estimation system of claim 12, wherein the cloud-computing architecture generates a new hybrid state estimation at least once per second.

18. The state estimation system of claim 12, wherein the cloud-computing architecture generates a new hybrid state estimation at least twice per second.

19. The state estimation system of claim 12, wherein the cloud-computing architecture configured to determine the power network topology by detecting a change of the power network topology using the set of phasors and to update the power network topology to include the detected change.

20. The state estimation system of claim 12, wherein the cloud-computing architecture configured to determine the power network topology by updating an on/off status of a circuit breaker of the power network topology in response to comparing the set of phasors to the power network topology.

* * * * *